(12) United States Patent
Chinn et al.

(10) Patent No.: US 6,970,749 B1
(45) Date of Patent: Nov. 29, 2005

(54) GROUPED PALETTE STASHING

(75) Inventors: Kathryn Chinn, Seattle, WA (US); Jennifer Oja, Columbus, OH (US); David Burnard, Forest Grove, OR (US)

(73) Assignee: Adobe Systems Incorporated, San Jose, CA (US)

( * ) Notice: Subject to any disclaimer, the term of this patent is extended or adjusted under 35 U.S.C. 154(b) by 182 days.

(21) Appl. No.: 10/712,867

(22) Filed: Nov. 12, 2003

(51) Int. Cl.$^7$ ............................................. G05B 11/01
(52) U.S. Cl. ............................ 700/12; 700/17; 700/25; 700/83; 700/86; 700/87; 715/503; 715/512; 715/517; 715/901; 715/910; 707/102; 707/103 R
(58) Field of Search .......................... 700/12, 17–18, 700/83, 86–87, 25; 715/503, 512, 513, 514, 715/517, 901, 970, 910; 707/100, 102, 103 R

(56) References Cited

U.S. PATENT DOCUMENTS

| | | | |
|---|---|---|---|
| 5,613,122 A | * | 3/1997 | Burnard et al. ................. 713/1 |
| 6,202,073 B1 | * | 3/2001 | Takahashi .................. 715/517 |
| 6,580,953 B1 | * | 6/2003 | Wiebe et al. .................. 700/86 |
| 6,898,468 B2 | * | 5/2005 | Ott et al. ........................ 700/21 |
| 2002/0078449 A1 | * | 6/2002 | Gordon et al. ................. 725/41 |
| 2002/0093841 A1 | * | 7/2002 | Kitayama et al. .............. 365/1 |
| 2003/0023956 A1 | * | 1/2003 | Dulberg et al. ............. 717/130 |

* cited by examiner

Primary Examiner—Ramesh Patel
(74) Attorney, Agent, or Firm—Fish & Richardson P.C.

(57) ABSTRACT

Methods and apparatus, including computer program products, implement techniques for representing control functions in a user application. A group of control palettes is provided in an application window of the user application. A user input associates the group of control palettes with a location within a region extending along one or more borders of a user interface. A stashed palette group is generated in response to the user input. The stashed palette group has an active state and an inactive state. The active state includes an expanded view that includes a representation of control data and/or control functions of one or more of the control palettes, arranged in a floating, non-modal window that covers a portion of the user interface in an area proximate to the location. The inactive state includes a collapsed view of the group arranged along the border in an area proximate to the location.

28 Claims, 5 Drawing Sheets

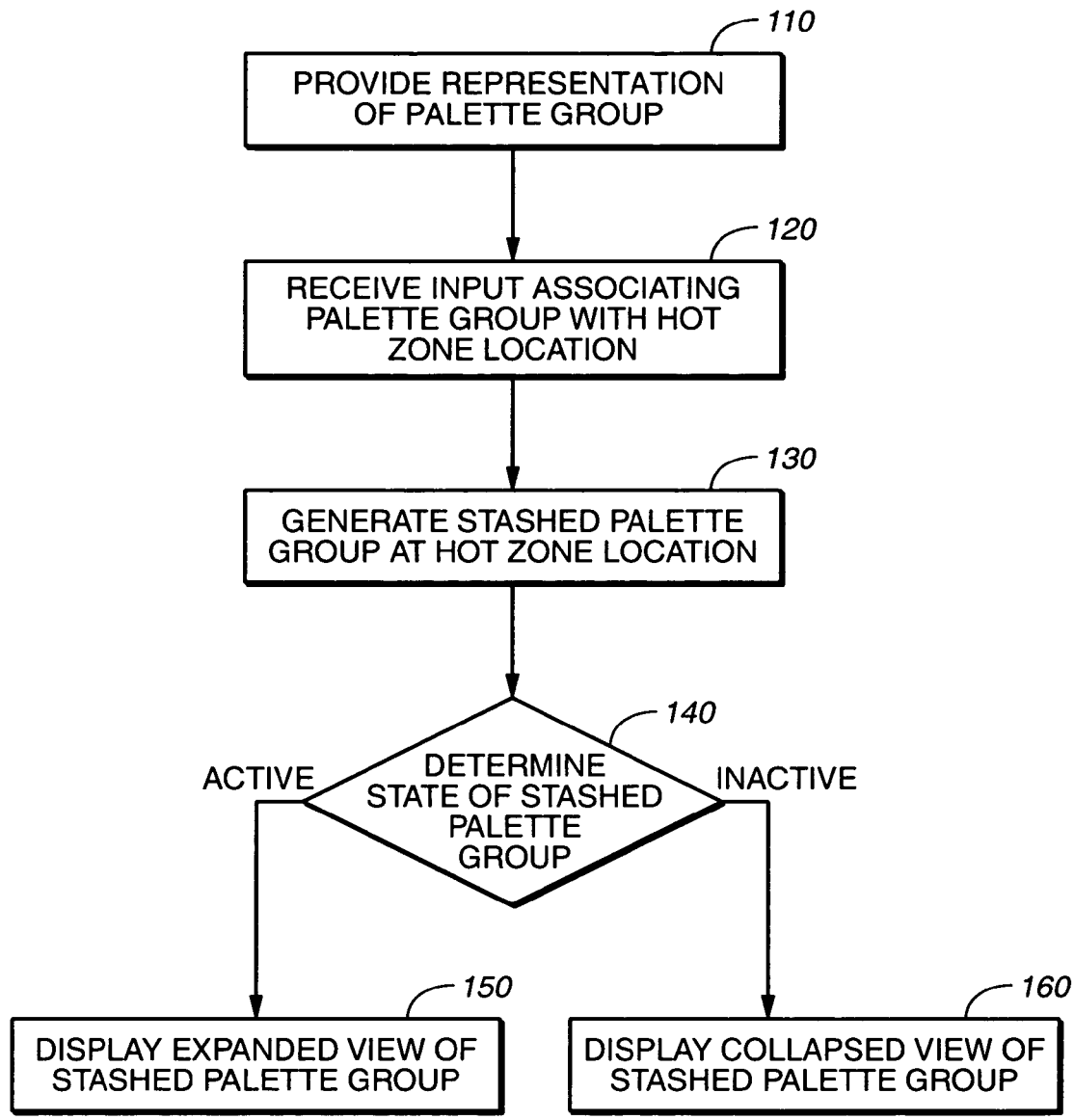
FIG._1

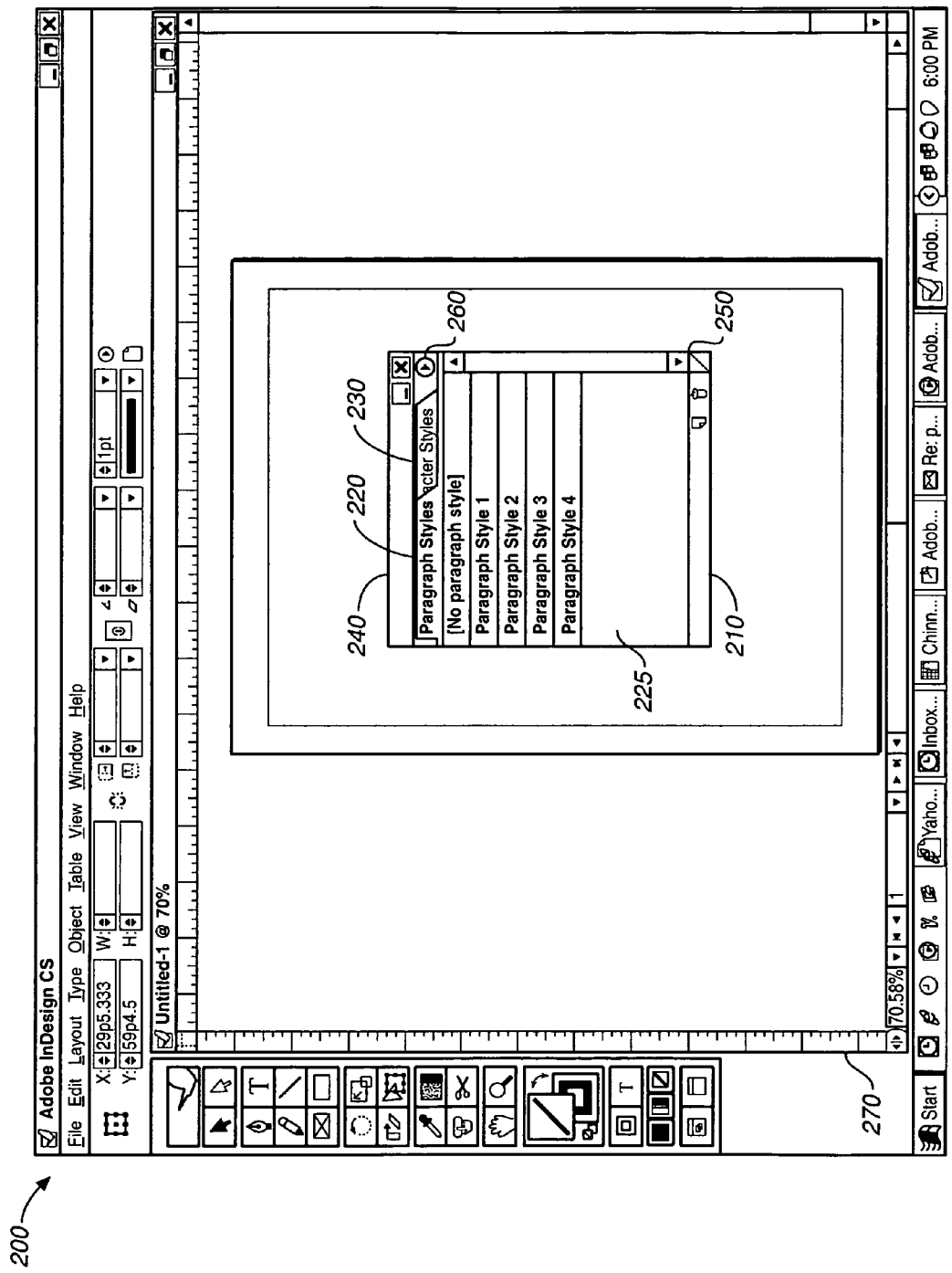
FIG._2A

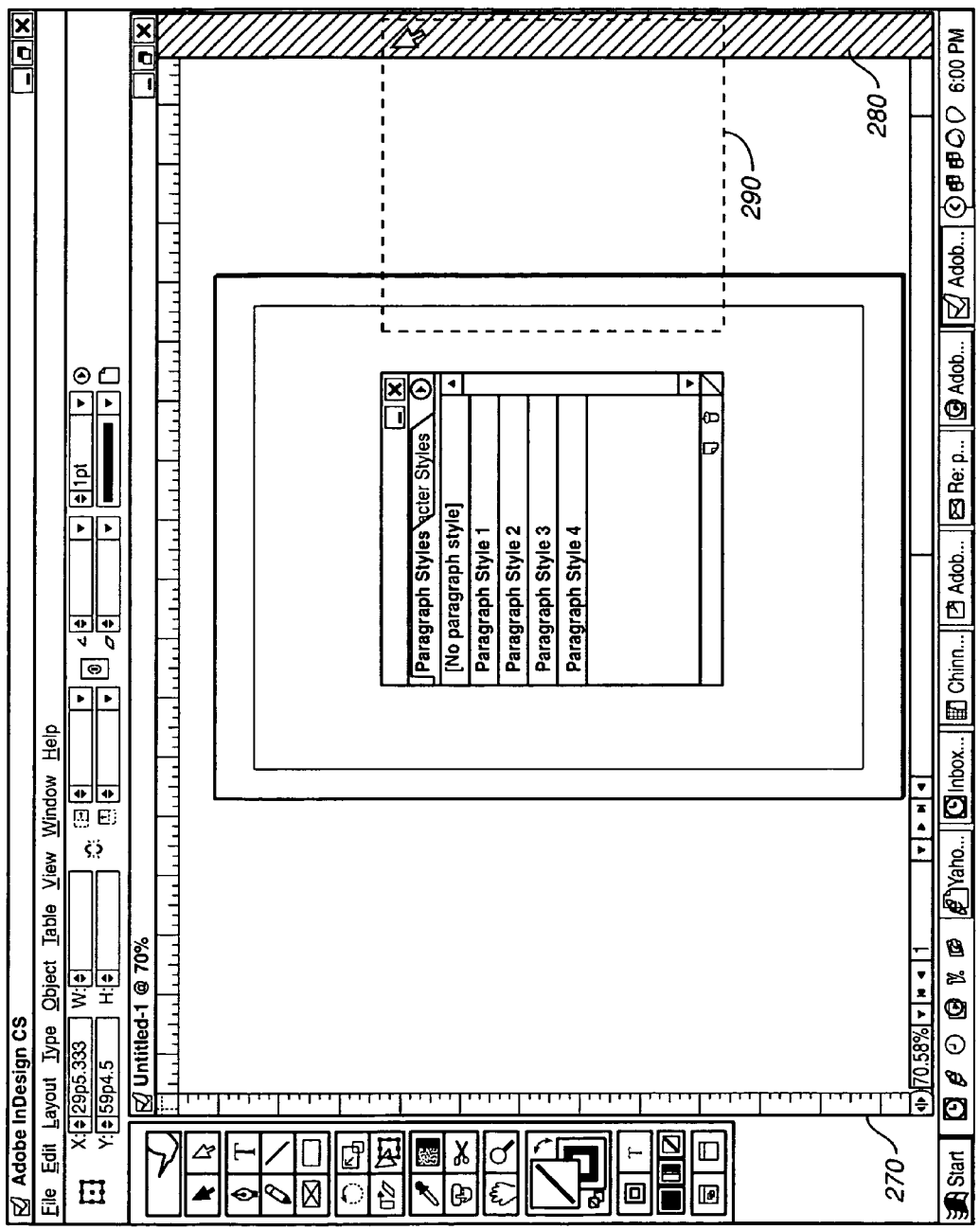
FIG._2B

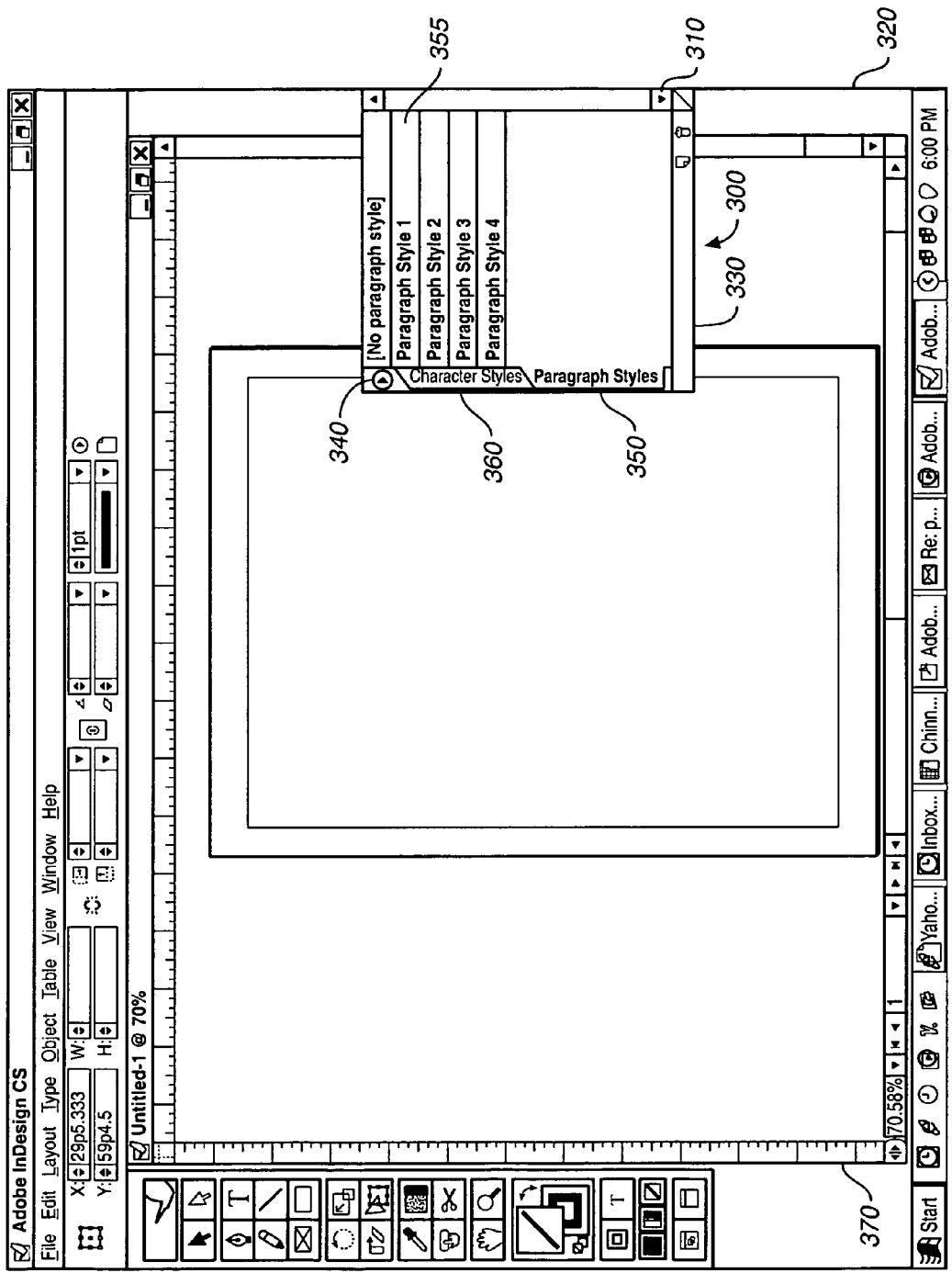
FIG._3

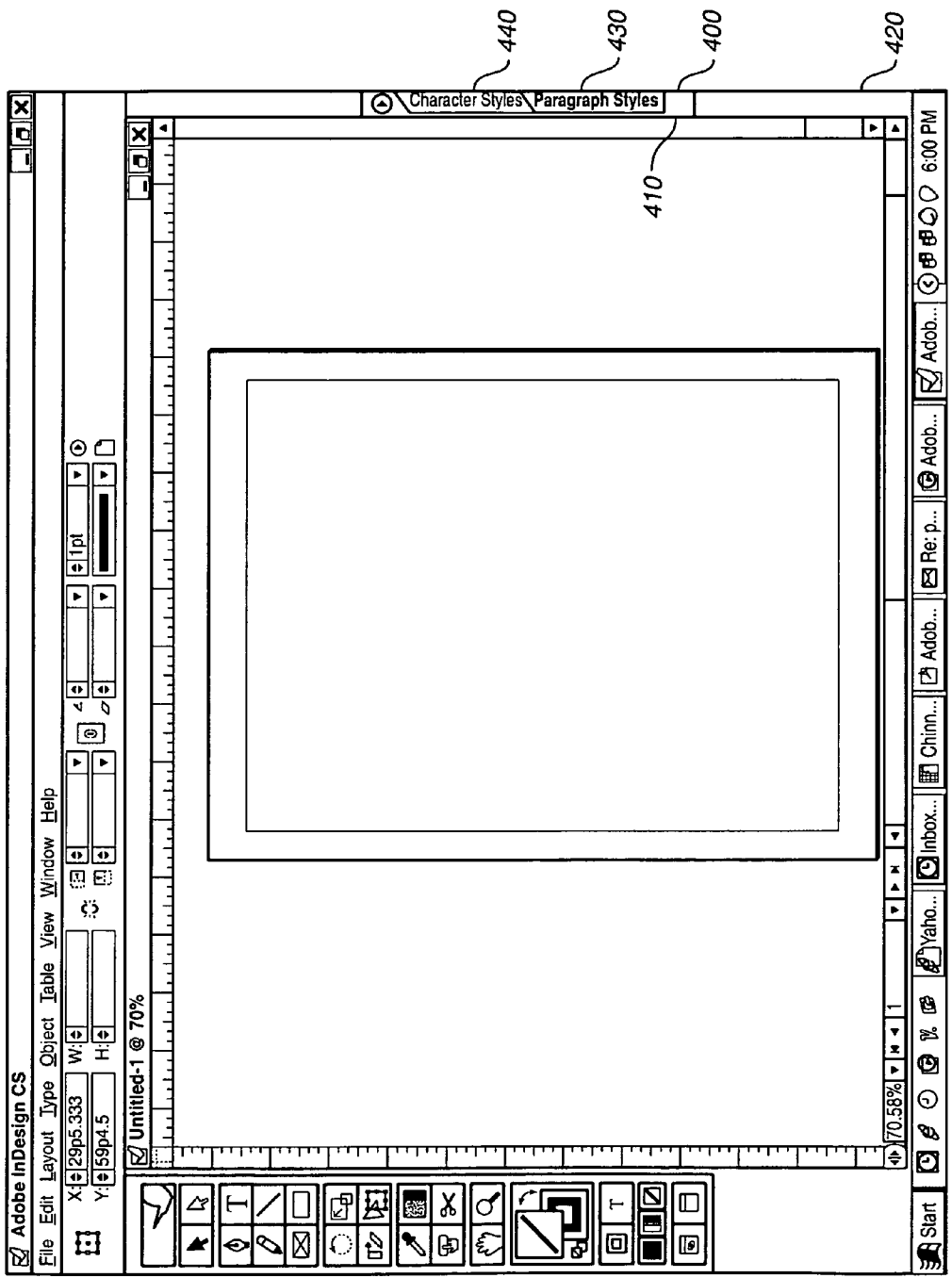
FIG._4

US 6,970,749 B1

GROUPED PALETTE STASHING

BACKGROUND

The present invention relates to presenting computer program application controls in a user interface.

Many conventional computer program applications provide for user interaction through a graphical user interface. To make the application's controls easily accessible to users, such applications typically provide a number of different user interface elements, such as toolbars, pull-down menus, dialog boxes, and floating palettes, with which the user can invoke commands, retrieve operations, and the like.

Toolbars typically feature an arrangement of interactive buttons that can be selected to invoke particular operations, and are typically arranged along an edge of an application window of the user interface. Pull-down menus are typically lists of commands that can be hidden and activated or pulled down with a pointing or cursor control device, such as a mouse or trackball, or a keyboard command. These single-word commands take up very little of the screen because the pull-down menu, in its collapsed state, has a very compact form, such as a single command word. Dialog boxes are interface elements that are typically composed of rectangular regions that appear outside of the document window. Dialog boxes are typically "modal" elements, which means that while a dialog box is active, action within the document is usually halted while the user is requested to select one or more of a number of options identified within the dialog box. The dialog box is then dismissed and disappears, and the document is updated based upon the selection that the user made from the dialog box.

By contrast, a floating palette (or simply a "palette" or "control palette") is a window that is subsidiary to the main application window and contains commands or tools that are used in an interactive fashion. For the purposes of this specification, a floating palette is a window that "floats" above any open document window, meaning that it remains "on top" of the document window, even when the palette is not the current focus. It should be noted that a palette is considered to be "on top" of an underlying document window if it appears directly over all or a portion of the underlying document window, or, if it does not appear over any portion of the document window (for example, if it appears to the side of a document window), if it would appear on top of the document window if either the palette or document window were moved so that the two overlap. As opposed to dialog boxes, floating palettes are "non-modal". This means that, unlike in modal elements, actions occurring within the document are not halted while the palettes are accessed by the user. Accordingly, floating palettes are most useful for holding tools and commands that a user needs to access interactively at the same time with the document itself.

Conventional applications often provide for a number of different control palettes, and often palettes provide the most convenient, or even the only, way to access some control features of the application. Palettes can sometimes be grouped or docked to provide for convenient access to functions that are frequently used together, such as in a workflow. Leaving multiple palettes or palette groups open on the desktop can consume valuable screen real estate, which can result in obscuring portions of a document being manipulated in the application. To avoid this, users can close any palettes or groups that are not being actively used, but to reopen those palettes or groups can require the user to invoke a sometimes complicated series of keystrokes, mouse movements or commands to reopen and reactivate the palettes if their functionality is later desired.

SUMMARY

In general, in one aspect, the invention provides methods and apparatus, including computer program products, implementing techniques for representing control functions in a user application that provides a plurality of control palettes, each control palette representing a set of control data and/or control functions of the user application. The techniques include providing a group of control palettes in an application window of the user application; receiving a first user input associating the group of control palettes with a first location within a region extending along one or more borders of a user interface; and generating a first stashed palette group in response to the first user input. The group of control palettes includes two or more of the plurality of control palettes. The first stashed palette group has an active state and an inactive state. The active state includes an expanded view of the group of control palettes. The expanded view includes a representation of at least a portion of the control data and/or control functions of one or more of the group of control palettes, arranged in a floating, non-modal window that covers a portion of the user interface in an area proximate to the first location. The inactive state includes a collapsed view of the group of control palettes arranged along the border in an area proximate to the first location.

In general, in another aspect, the invention provides methods and apparatus, including computer program products, implementing similar techniques for representing control functions in a user application that provides a plurality of control palettes, each control palette representing a set of control data and/or control functions of the user application. The techniques include providing a stashed palette group including two or more of the plurality of control palettes of the user application; determining whether the stashed palette group is in an active state or an inactive state; if the stashed palette group is in the active state, displaying an expanded view of the stashed palette group at the location; and if the stashed palette group is in the inactive state, displaying a collapsed view of the stashed palette group arranged along the border at the location. The stashed palette group is associated with a location in a region extending along one or more borders of a user interface. The expanded view includes a representation of at least a portion of the control data and/or control functions of one or more of control palettes in the stashed palette group, arranged in a floating, non-modal window that covers a portion of the user interface in an area proximate to the location.

Particular implementations can include one or more of the following features.

Additional stashed palette groups can be defined in response to user input associating additional groups of control palettes with locations within the region extending along one or more borders of the user interface. Stashed palette groups can be moved to different locations within the region extending along the borders of the user interface. The region can extend along one or more of a right border, a left border, a top border, and a bottom border of the user interface. The user interface can be a display screen of a computer monitor or an application window presented on a display screen of a computer monitor. Each of the control palettes can have a control tab and a control area, where the control area includes a representation of the control data and/or control functions of the respective control palette; the expanded view can include a representation of at least a portion of the control area of one or more of the control palettes in the group; and the collapsed view can include a representation of an arrangement of the control tabs of the control palettes in the group, arranged along the border in the area proximate to the first location. A stashed palette group can include a stashed palette group control that is selectable to activate a control element representing one or more selectable functions associated with the stashed palette group. The size of the area occupied by a stashed palette group can be configurable by a user of the user application.

Control palettes can be moved out of stashed palette groups in response to user input associating a control palette in a stashed palette group with a location outside of the stashed palette group. For example, a control palette can be moved from one stashed palette group to another stashed palette group in response to user input dragging and dropping the control palette from the first stashed palette group to the area occupied by the second stashed palette group. Stashed palette groups can be eliminated in response to user input disassociating all control palettes in the stashed palette group from the stashed palette group. Where there are multiple stashed palette groups defined in a user interface, each stashed palette group can be displayed in the active or inactive state, independent of the state of any other stashed palette group in the display.

The invention can be implemented to realize one or more of the following advantages. Accessing control palettes in stashed palette groups can be more efficient than accessing control palettes individually. Stashed palette groups can be located along borders of a user interface of a user application. Stashed palette groups can be displayed in an expanded view, in which the control data and/or control functions of the corresponding control palettes can be accessed by the user, and in a collapsed view, in which the corresponding control palettes remain accessible but occupy minimal screen real estate. The expanded view is a non-modal display window and can remain active while activity is performed in underlying documents in the application window. The expanded view is a floating window. Changing from the collapsed view of the inactive state to the expanded view of the active state does not result in resizing of underlying documents in active document windows of the user application. Users can create stashed palette groups containing any desired combination, and any number, of control palettes. Any number of stashed palette groups can be created. Each stashed palette group can be expanded or collapsed independently. Stashed palette groups can be created at any location within a "hot zone" along the border or borders of the user interface. Control palettes associated with a stashed palette groups can be manipulated as a group. Stashed palette groups can be moved from one location to another location in the hot zone. Stashed palette groups can be resized. Additional control palettes can be added to, and control palettes can be removed from, existing stashed palette groups. When a stashed palette group is created, the maximum document window size can be adjusted so that controls in the vicinity of the border of the user interface (such as window scroll controls along the right edge of a maximized document window) will not be obscured by the collapsed view of the stashed palette group. Stashed palette groups can be configured to activate and expand automatically when a user navigates a cursor over the collapsed view of the inactive palette, and to automatically collapse again when the user navigates away from the region.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a flow diagram illustrating a method of creating a stashed palette group according to one aspect of the invention.

FIG. 2A is a representation of a user interface showing a floating display window for a group of control palettes.

FIG. 2B is a representation of a user interface showing the association of the palette group of FIG. 2A with a hot zone location according to one implementation of the invention.

FIG. 3 is a representation of a user interface showing an expanded view of a stashed palette group according to one implementation of the invention.

FIG. 4 is a representation of a user interface showing a collapsed view of a stashed palette group according to one implementation of the invention.

Like reference symbols in the various drawings indicate like elements.

DETAILED DESCRIPTION

A computer-implemented document processing system according to one aspect of the invention features a computer program application (which will be referred to as a "user application" in this specification) having a graphical user interface in which a user can manipulate groups of control palettes in order to organize and manage control functions of the user application with minimal disruption to the display of an electronic document that is being processed in the user application. The user application provides "hot zones", or regions extending along one or more borders in the user interface, in which the user can "stash" groups of control palettes for further use. These "stashed palette groups" are anchored or attached to a border or edge of the user interface, can be easily activated and deactivated to provide expanded and collapsed views of the control palettes in the group, and maintain their association as a group throughout the stashed state.

FIG. 1 illustrates a method 100, implemented in a user application as discussed above, for generating a stashed palette group according to one aspect of the invention. The user application provides a representation of a group of control palettes in a graphical user interface (step 110), such as a group 210 presented in an application window 200, as shown in FIG. 2A. The group of control palettes includes a plurality of associated control palettes—for example, Paragraph Styles palette 220 and Character Styles palette 230 in group 210. The group of control palettes can represent a predefined group of control palettes provided in the user application—for example, a set of multiple control palettes having related functions—or a user-defined group of control palettes, such as, a set of control palettes that are used together in a particular workflow by a particular user.

As illustrated in FIG. 2A, group 210 includes content and decoration. The decoration includes a title bar 240 and borders 250. A control button 260 is selectable by a user with a cursor to activate a drop-down menu of functions, which can include functions to close or hide the group, as well as a set of functions specific for the group or the currently active (i.e., top-most) control palette. A hidden palette group can be made visible again by choosing an appropriate menu command. The group floats above a document in document window 270. The group can be moved anywhere on the computer screen—for example, by selecting title bar 240 with a pointing device and performing a "click and drag" operation. The group can be resized by, for example, selecting a border and dragging to define a desired size. The floating representation of the group can be overlapped with other palettes or palette groups in the display.

The content of the group includes a representation of each of its constituent palettes 220 and 230. Each palette in group 210 is represented by a control tab as shown in FIG. 2A. In one implementation, one of the palettes in group 210 is active, such that the control area of the active palette—here, control area 225 of Paragraph Styles palette 220—is displayed in the display window of group 210. The control areas of the remaining palettes in the group (e.g., Character Styles palette 230) are hidden, but can be activated and made visible by selecting the appropriate control tab to bring the corresponding palette to the front of the group. Alternatively, only some of the control area of the top-most control palette may be displayed (for example, if the display window is sized too small to display the entire control area). The user can access the control data and/or control functions of the active palette or palettes in the displayed control area or areas. Because the group display window is non-modal, the user can access any underlying document without causing the group display window to collapse or disappear.

Returning to FIG. 1, method 100 receives user input selecting a palette group and associating the selected palette group with a location in region along a border of the user interface (step 120). In one implementation, the user can select the corresponding title bar 240 to select group 210, and drag the selected group to a predetermined "hot zone" 280 along a border of the user interface, as shown in FIG. 2B. The hot zone can include one or more regions defined along the borders of the user interface—for example, along one, two, three or four edges of application window 200. Typically, the hot zone is a region five, ten or fifteen pixels wide, although other widths can be used. The hot zone can also be defined along other edges or borders in the user interface, such as the edges of the computer display screen or the edges of document window 270. Optionally, the user application can be configurable to allow the user to specify the hot zone—for example, which, and how many, borders of the user interface should be used to define the hot zone—and whether the hot zone is active (that is, whether the user application will create additional stashed palette groups when the user drags palettes or palette groups into the hot zone). It should be noted that while hot zone 280 is illustrated in FIG. 2B as a crosshatched region along the right border of the application window, in typical implementations of the invention the hot zone need not be visibly represented to the user.

The method then generates a stashed palette group in an area at the hot zone location with which the palette group was associated in step 120 (step 130). In one implementation, when the selected group is dragged into the hot zone, the group (or an outline representation 290 that is substituted for the group window during the movement) "snaps" to the nearest edge of the user interface. When the pointing device is then released, the method represents the selected palette group as a stashed palette group at the location, as will be described in more detail below. Optionally, if the group is moved out of the hot zone without releasing the pointing device, no stashed palette group is created and the original palette group is displayed wherever it is dropped by the release of the pointing device.

A stashed palette group according to the invention can include one or more control palettes. A stashed palette group has an active state and an inactive state, and is displayed differently depending on its state. If the stashed palette group is in the active state (the "ACTIVE" branch of step 140), the method displays an expanded view of the stashed palette group (step 150), as illustrated in FIG. 3. Similar to the active view of the group 210 shown in FIG. 2A, in an expanded view 300 of the stashed palette group, the stashed palette group is displayed in a floating, non-modal window 310. The expanded view window is attached to the edge of the user interface—in this case, application window 320—in the area of the hot zone location that is associated with the stashed palette group. The expanded view window 300 floats above document window 370, such that the expanded view window always appears on top of document window 370 and is unaffected when the document window 370 is moved, resized, or otherwise manipulated in the user application. In one implementation, when a stashed palette group is created, the user application adjusts the maximum size of a document window 370 in the application window 320, so that controls along the border of the user interface (such as window scroll controls along the right edge of a document window) will not be obscured by the collapsed view of the stashed palette group, as is shown in FIG. 4.

Expanded view window 310 includes content and decoration. The decoration includes a border 330. In some implementations, the decoration can include additional features, such as a title bar as described above in the context of FIG. 2A, which can be located along the top edge of expanded view window 310, or along other edges; in some implementations, the title bar can be in a different location depending on where the stashed palette group is located—for example, the title bar can be located along the left edge of the expanded view window of a stashed palette group that is stashed along the right border of the user interface, but along the right edge of the expanded view window when the stashed palette group is stashed along the left border of the user interface.

The expanded view window includes a control button 340 that is selectable by a user to activate a drop-down menu of functions, which can include a function to collapse the expanded view, thereby changing the stashed palette group from the active state to the inactive state, as well as other functions specific for the group or the currently-active (i.e., top-most) control palette. Optionally, a user can also change the state of the stashed palette group from active to inactive by performing some other act, such as activating an appropriate control key or control key sequence, by selecting a corresponding menu item, or by selecting the control tab of the currently active control palette in expanded view 300.

The stashed palette group can be moved to different locations along the border or borders of the user interface—for example, by clicking (or activating some predetermined control key or control key sequence) to select a predetermined region of the stashed palette group (such as the borders, title bar, or, e.g., area behind the control tabs) with a pointing device and dragging the expanded view window to another hot zone location in the display. In one implementation, the stashed palette group can be moved by moving a vertical border of the expanded view up or down, or moving a horizontal border left or right, which results in a corresponding movement of the stashed palette group. The expanded view window can be resized by, for example, selecting a border 330 and dragging to define a desired size. In one implementation, the expanded view window can be resized in the horizontal or vertical dimensions, or both. Alternatively, the height or width of the expanded view window of a stashed palette group can be fixed (for example, based on the identity—and dimensions—of the control palettes in the group). The expanded view window can overlap or be overlapped by other palettes or palette groups (both floating and stashed) in the display.

The content of the expanded view window includes a representation of each of its constituent palettes 350, 360. Each palette in the stashed palette group is represented in the expanded view by a control tab, arranged such that the control palettes in the group appear to be stacked like tabbed index cards. In one implementation, one of the palettes in the stashed palette group is active, such that the control area of the active palette—here, control area 355 of Paragraph Styles palette 350 is displayed in the expanded view window 310. The control areas of the remaining palettes in the group (e.g., Character Styles palette 360) are hidden, but can be activated and made visible by selecting the appropriate control tab to bring the corresponding palette to the front of the group. Alternatively, only some of the control area of the top-most control palette may be displayed (for example, if the display window is sized too small to display the entire control area). In still another alternative, some or all of the control areas of more than one control palette in the group can be displayed simultaneously (i.e., more than one palette in the group can be active at a time)—for example, individual control palettes or groups of palettes in a stashed palette group can be "docked", such that control areas for multiple control palettes can be simultaneously displayed in the expanded view. The user can access the control data and/or control functions of the active palette or palettes in the displayed control area or areas. Because the expanded view window 310 is non-modal, the user can access any underlying document without causing the expanded view window to collapse or disappear.

Optionally, the expanded view of a stashed palette group can differ from the active view of the "unstashed" version of the same palette group—for example, while the control tabs of a typical (unstashed) floating palette group may be aligned horizontally along the top or bottom of the display window of the group, the control tabs of a stashed palette group can be oriented along the nearest border of the user interface. Additionally, the expanded view window of a stashed palette group can include a different set of controls than are present in the display window of the corresponding unstashed palette group.

If the stashed palette group is in the inactive state (the "INACTIVE" branch of step 140), the method displays a collapsed view of the stashed palette group (step 160), as illustrated in FIG. 4. In a collapsed view 400, the expanded view is replaced by a smaller window attached to and arranged along the edge of the user interface (e.g., application window 420) in the area of the hot zone location that is associated with the stashed palette group. Like the expanded view, the collapsed view 400 has a border 410 and includes a control tab 430, 440 (which can take the familiar form of a tab on an index card as shown, or any other selectable user interface element, such as a button, icon or the like) for each of the control palettes in the stashed palette group. Also like the expanded view, the collapsed view 400 can also include additional features, such as a title bar, a control button that is selectable by a user to expand the collapsed view and/or to activate a drop-down menu of functions, such as a set of functions specific for the group or the currently-active (i.e., top-most) control palette of the stashed palette group. If necessarily, the control tabs and other features of the expanded view window can be reoriented in the collapsed view when the stashed palette group changes from the active to the inactive state, and vice versa. In one implementation, the collapsed view window is inserted between the inner edge of the application window and the outer edge of any document windows currently displayed within the application window. In such implementations, the collapsed view window may or may not be a floating window.

Unlike the expanded view, the collapsed view 400 does not include a representation of the control areas of the palettes in the stashed palette group. To access the control data or control functions of the corresponding control palettes, the user must either select a corresponding menu button, as described above, to access menu functions for the top-most control palette, or change the state of the stashed palette group from inactive to active. In one implementation, a stashed palette group in the inactive (collapsed view) state can be activated by selecting an appropriate control button or menu item (or even the title bar or border of the collapsed view), by executing an appropriate control key or control key sequence, or by selecting the control tab of any palette in the stashed palette group in collapsed view 400. In response, the expanded view of the stashed palette group replaces the collapsed view, expanding from the border into the display window (e.g., the application window or display screen). In one implementation, a user can also temporarily activate an inactive stashed palette group by placing the cursor over the collapsed view of the stashed palette group—for example, over one of the control tabs—in response to which the user application temporarily displays the expanded view of the stashed palette group. Because the expanded view window is a floating window, when the state of a stashed palette group is changed from the inactive state to the active state, the expanded view window is displayed above any active document or documents in the application window, and the underlying document windows are not resized.

In one implementation, the user can resize the collapsed view window by selecting a border 410 of the collapsed view window and dragging to define a desired new size, and can move the stashed palette group to a new location along the border or borders of the user interface—for example, by selecting a title bar of the collapsed view or activating some other predetermined control key or control key sequence, and dragging the collapsed view window to another hot zone location in the display.

In one implementation, when a stashed palette group is defined, the user application displays the stashed palette group in its active (i.e., expanded view) state. Alternatively, the user application can be configurable to allow users to specify whether a given stashed palette group should be created in its active or inactive state—for example, by prompting the user to select a desired state when creating the stashed palette group, or by receiving a control key or key sequence indicating the desired state as a part of the creation process. The user application can be configured to display the expanded view of a stashed palette view in a standard or default size, such as a standard width or height, subject to resizing by the user in the height or width dimension, or both, as discussed above. In one implementation, the user application is configured with a standard height and width that is defined differently for each control palette, such that when a stashed palette group is created, the user application displays an expanded view having the dimensions of the largest control palette in the group (or the width of the widest control palette and the height of the tallest control palette in the group). Alternatively, the size of the expanded view can be determined in the first instance (subject to resizing) by the dimensions of the top-most control palette in the group.

In some implementations, the user application can have a standard or default state in which one or more stashed palette groups are defined by default, such that whenever a user initiates the user application, the corresponding control palettes are represented as being members of a stashed palette group or groups. Optionally, user-defined stashed palette groups (or user-defined attributes of predefined stashed palette groups, such as location or which control palette is active) can be saved for future use.

The method 100 can be repeated to define additional stashed palette groups, which can be displayed in different locations along the borders of the user interface. Different stashed palette groups can overlap in the display, and can be represented in different states, such that one stashed palette group can be displayed in the active (expanded view) state, while another can be represented at the same time in the inactive (collapsed view) state.

Additional control palettes can be associated with an existing stashed palette group by selecting the desired palette or palettes (e.g., by selecting the title bar of the palette's or palette group's display window) and dragging until the selected palette or palettes overlap with a view of the desired stashed palette group. If the selected palette is dropped at this point, the selected palette is added to the stashed palette group, such that the control tab of the selected control palette is added to the current view of the stashed palette group. Optionally, the selected control palette can be made the active (top-most) palette in the stashed palette group, such that the control tab of the selected palette is the top-most in the sequence of control tabs in the current view and, if the stashed palette group is in the active state, the control area of the selected control palette is also displayed. In any future manipulation of the stashed palette group, such as movement or resizing, the selected control palette will be treated as a member of the stashed palette group. In some implementations, the user application can be configured to permit users to add additional control palettes only to active stashed palette groups. Alternatively, users can be permitted to add additional control palettes to stashed palette groups in either the active or inactive states. Optionally, if a user adds a control palette to a stashed palette group that is in the inactive state, the stashed palette group can be activated and the corresponding expanded view, including the newly added control palette, displayed.

Similarly, control palettes can be removed from existing stashed palette groups by eliminating the association between the palette and group in question. For example, the user can click on the control tab of the desired control palette in the expanded or collapsed view of the stashed palette group and drag until the control palette (e.g., an outline representation of the control tab and/or control area of the palette) is no longer within the current view window of the stashed palette group. In one implementation, a display window of the removed control palette is then displayed at another location in the user interface. The removed control palette is no longer treated as a member of the stashed palette group, such that the group can be moved, resized or otherwise manipulated without affecting the removed control palette, and the removed palette can likewise be manipulated without affecting the stashed palette group. Using these techniques, a control palette that is a member of one stashed palette group can be moved to a different stashed palette group (or to a conventional (unstashed) floating palette group by moving the control palette from the display window of the first stashed palette group to the display window of the second group.

A stashed palette group can be eliminated by eliminating the association between the stashed palette group and each of its member control palettes. For example, if the user removes each of the control palettes from a stashed palette group as described above, the user application can eliminate the stashed palette group and remove the current view of the group from the user interface. Alternatively, or in addition; the user application can provide a button or menu item that is selectable to eliminate the stashed palette group as well. The control palettes that formerly belonged to an eliminated stashed palette group can then be manipulated as any other control palette in the user application. The user application can also be configured to allow the user to convert a stashed palette group into a conventional floating palette group—for example, by selecting a border or title bar of a stashed palette group, dragging the cursor into the application window, and dropping at a location outside of the hot zone.

The invention and all of the functional operations described in this specification can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results.

What is claimed is:

1. A method of representing control functions in a user application, the user application providing a plurality of control palettes, each control palette representing a set of control data and/or control functions of the user application, the method comprising:
   providing a group of control palettes in an application window of the user application, the group of control palettes including two or more of the plurality of control palettes;
   receiving a first user input associating the group of control palettes with a first location within a region extending along one or more borders of a user interface; and
   generating a first stashed palette group in response to the first user input, the first stashed palette group having an active state and an inactive state,
      the active state including an expanded view of the group of control palettes, the expanded view including a representation of at least a portion of the control data and/or control functions of one or more of the group of control palettes, arranged in a floating, non-modal window that covers a portion of the user interface in an area proximate to the first location, and
      the inactive state including a collapsed view of the group of control palettes arranged along the border in an area proximate to the first location.

2. The method of claim 1, further comprising:
   receiving a second user input associating a second group of control palettes with a second location within the region extending along one or more borders of the user interface; and
   generating a second stashed palette group in response to the second user input, the second stashed palette group having an active state and an inactive state,
      the active state including an expanded view of the second group of control palettes, the expanded view including a representation of at least a portion of the control data and/or control functions of one or more of the second group of control palettes, arranged in a floating, non-modal window that covers a portion of the user interface in an area proximate to the second location, and
      the inactive state including a collapsed view of the second group of control palettes arranged along the border in an area of proximate to the second location.

3. The method of claim 1, further comprising:
   receiving a third user input associating the first stashed palette group with a third location within the region extending along one or more borders of the user interface; and
   representing the first stashed palette group in an area of the user interface proximate to the third location.

4. The method of claim 1, wherein:
   the region extends along one or more of a right border, a left border, a top border, and a bottom border of the user interface.

5. The method of claim 1, wherein:
   the user interface is a display screen of a computer monitor or an application window presented on a display screen of a computer monitor.

6. The method of claim 1, wherein:
   each of the first group of control palettes has a control tab and a control area, the control area including a representation of the control data and/or control functions of the respective control palette;
   the expanded view includes a representation of at least a portion of the control area of one or more of the first group of control palettes; and
   the collapsed view includes a representation of an arrangement of the control tabs of the first group of control palettes along the border in the area proximate to the first location.

7. The method of claim 1, wherein:
   the first stashed palette group includes a stashed palette group control, the stashed palette group control being selectable to activate a control element representing one or more selectable functions associated the first stashed palette group.

8. The method of claim 1, wherein:
   the size of the area occupied by the first stashed palette group is configurable by a user of the user application.

9. The method of claim 2, further comprising:
   receiving a fourth user input associating a control palette in the first group of control palettes with the second stashed palette group; and
   moving the associated control palette to the second stashed palette group in response to the fourth user input.

10. The method of claim 1, further comprising:
    receiving a fifth user input associating a control palette in the first group of control palettes with a location outside of the first stashed palette group; and
    in response to the fifth user input, displaying a representation of the control palette at the location outside of the first stashed palette group, and removing the control palette from the first stashed palette group.

11. The method of claim 1, further comprising:
    receiving a sixth user input disassociating all of the control palettes of the first group of control palettes with the first stashed palette group; and
    in response to the sixth user input, eliminating the first stashed palette group.

12. The method of claim 2, further comprising:
    simultaneously representing the first stashed palette group in the active state in the area proximate to the first location and the second stashed palette group in the inactive state in the area proximate to the second location.

13. A method of representing control functions in a user application, the user application providing a plurality of control palettes, each control palette representing a set of control data and/or control functions of the user application, the method comprising:
    providing a stashed palette group including two or more of the plurality of control palettes of the user application, the stashed palette group being associated with a location in a region extending along one or more borders of a user interface;

determining whether the stashed palette group is in an active state or an inactive state;

if the stashed palette group is in the active state, displaying an expanded view of the stashed palette group at the location, the expanded view including a representation of at least a portion of the control data and/or control functions of one or more of control palettes in the stashed palette group, arranged in a floating, non-modal window that covers a portion of the user interface in an area proximate to the location; and if the stashed palette group is in the inactive state, displaying a collapsed view of the stashed palette group arranged along the border at the location.

14. The method of claim 13, further comprising:

providing a second stashed palette group including two or more of the plurality of control palettes of the user application, the second stashed palette group being associated with a second location in the region extending along one or more borders of the user interface;

determining whether the second stashed palette group is in an active state or an inactive state;

if the second stashed palette group is in the active state, displaying an expanded view of the second stashed palette group at the second location, the expanded view including a representation of at least a portion of the control data and/or control functions of one or more of control palettes in the second stashed palette group, arranged in a floating, non-modal window that covers a portion of the user interface in an area proximate to the second location; and if the second stashed palette group is in the inactive state, displaying a collapsed view of the second stashed palette group arranged along the border at the second location.

15. A computer program product, tangibly embodied in an information carrier, for representing control functions in a user application, the user application providing a plurality of control palettes, each control palette representing a set of control data and/or control functions of the user application, the product including instructions operable to cause data processing apparatus to perform operations comprising:

providing a group of control palettes in an application window of the user application, the group of control palettes including two or more of the plurality of control palettes;

receiving a first user input associating the group of control palettes with a first location within a region extending along one or more borders of a user interface; and generating a first stashed palette group in response to the first user input, the first stashed palette group having an active state and an inactive state, the active state including an expanded view of the group of control palettes, the expanded view including a representation of at least a portion of the control data and/or control functions of one or more of the group of control palettes, arranged in a floating, non-modal window that covers a portion of the user interface in an area proximate to the first location, and the inactive state including a collapsed view of the group of control palettes arranged along the border in an area proximate to the first location.

16. The computer program product of claim 15, further comprising instructions operable to cause data processing apparatus to perform operations comprising:

receiving a second user input associating a second group of control palettes with a second location within the region extending along one or more borders of the user interface; and generating a second stashed palette group in response to the second user input, the second stashed palette group having an active state and an inactive state, the active state including an expanded view of the second group of control palettes, the expanded view including a representation of at least a portion of the control data and/or control functions of one or more of the second group of control palettes, arranged in a floating, non-modal window that covers a portion of the user interface in an area proximate to the second location, and the inactive state including a collapsed view of the second group of control palettes arranged along the border in an area of proximate to the second location.

17. The computer program product of claim 15, further comprising instructions operable to cause data processing apparatus to perform operations comprising:

receiving a third user input associating the first stashed palette group with a third location within the region extending along one or more borders of the user interface; and representing the first stashed palette group in an area of the user interface proximate to the third location.

18. The computer program product of claim 15, wherein:

the region extends along one or more of a right border, a left border, a top border, and a bottom border of the user interface.

19. The computer program product method of claim 15, wherein:

the user interface is a display screen of a computer monitor or an application window presented on a display screen of a computer monitor.

20. The computer program product of claim 15, wherein:

each of the first group of control palettes has a control tab and a control area, the control area including a representation of the control data and/or control functions of the respective control palette;

the expanded view includes a representation of at least a portion of the control area of one or more of the first group of control palettes; and the collapsed view includes a representation of an arrangement of the control tabs of the first group of control palettes along the border in the area proximate to the first location.

21. The computer program product of claim 15, wherein:

the first stashed palette group includes a stashed palette group control, the stashed palette group control being selectable to activate a control element representing one or more selectable functions associated the first stashed palette group.

22. The computer program product of claim 15, wherein:

the size of the area occupied by the first stashed palette group is configurable by a user of the user application.

23. The computer program product of claim 16, further comprising instructions operable to cause data processing apparatus to perform operations comprising:

receiving a fourth user input associating a control palette in the first group of control palettes with the second stashed palette group; and moving the associated control palette to the second stashed palette group in response to the fourth user input.

24. The computer program product of claim 15, further comprising instructions operable to cause data processing apparatus to perform operations comprising:

receiving a fifth user input associating a control palette in the first group of control palettes with a location outside of the first stashed palette group; and in response to the fifth user input, displaying a representation of the control palette at the location outside of the first stashed palette group, and removing the control palette from the first stashed palette group.

25. The computer program product of claim 15, further comprising instructions operable to cause data processing apparatus to perform operations comprising:

receiving a sixth user input disassociating all of the control palettes of the first group of control palettes with the first stashed palette group; and in response to the sixth user input, eliminating the first stashed palette group.

26. The computer program product of claim 16, further comprising instructions operable to cause data processing apparatus to perform operations comprising:

simultaneously representing the first stashed palette group in the active state in the area proximate to the first location and the second stashed palette group in the inactive state in the area proximate to the second location.

27. A computer program product, tangibly embodied in an information carrier, for representing control functions in a user application, the user application providing a plurality of control palettes, each control palette representing a set of control data and/or control functions of the user application, the product including instructions operable to cause data processing apparatus to perform operations comprising:

providing a stashed palette group including two or more of the plurality of control palettes of the user application, the stashed palette group being associated with a location in a region extending along one or more borders of a user interface;

determining whether the stashed palette group is in an active state or an inactive state;

if the stashed palette group is in the active state, displaying an expanded view of the stashed palette group at the location, the expanded view including a representation of at least a portion of the control data and/or control functions of one or more of control palettes in the stashed palette group, arranged in a floating, non-modal window that covers a portion of the user interface in an area proximate to the location; and if the stashed palette group is in the inactive state, displaying a collapsed view of the stashed palette group arranged along the border at the location.

28. The computer program product of claim 27, further comprising instructions operable to cause data processing apparatus to perform operations comprising:

providing a second stashed palette group including two or more of the plurality of control palettes of the user application, the second stashed palette group being associated with a second location in the region extending along one or more borders of the user interface;

determining whether the second stashed palette group is in an active state or an inactive state;

if the second stashed palette group is in the active state, displaying an expanded view of the second stashed palette group at the second location, the expanded view including a representation of at least a portion of the control data and/or control functions of one or more of control palettes in the second stashed palette group, arranged in a floating, non-modal window that covers a portion of the user interface in an area proximate to the second location; and if the second stashed palette group is in the inactive state, displaying a collapsed view of the second stashed palette group arranged along the border at the second location.

* * * * *